United States Patent [19]

Ulan

[11] Patent Number: 5,480,556
[45] Date of Patent: Jan. 2, 1996

[54] TRAPPING AND SEALING PROCESS

[76] Inventor: Judith G. Ulan, #126 10951 Mortfield Road, Richmond, British Columbia, Canada, V7A 2W5

[21] Appl. No.: 218,137

[22] Filed: Mar. 25, 1994

Related U.S. Application Data

[63] Continuation of Ser. No. 723,788, Jul. 1, 1991, abandoned.
[51] Int. Cl.$^6$ ................................................ B01D 53/04
[52] U.S. Cl. ........................... 210/681; 95/133; 95/902; 210/684
[58] Field of Search ..................... 95/116, 132, 133, 95/902; 210/681, 684

[56] References Cited

U.S. PATENT DOCUMENTS

| | | | |
|---|---|---|---|
| 2,935,539 | 5/1960 | Gladrow et al. | 55/75 X |
| 3,006,153 | 10/1961 | Cook | 55/75 X |
| 3,061,654 | 10/1962 | Gensheimer et al. | 55/75 X |
| 3,147,225 | 9/1964 | Ryan | 252/301.1 |
| 3,167,504 | 1/1965 | Hayden et al. | 210/682 X |
| 3,305,656 | 2/1967 | Devins | 55/75 X |
| 3,316,691 | 5/1967 | Sesny et al. | 55/75 X |
| 3,959,172 | 5/1976 | Brownell et al. | 252/301.1 |
| 4,224,177 | 9/1980 | Macedo et al. | 252/301.1 |
| 4,272,382 | 6/1981 | Ogata et al. | 210/660 |
| 4,310,440 | 1/1982 | Wilson et al. | 252/435 |
| 4,440,871 | 4/1984 | Lok et al. | 502/214 |
| 4,466,812 | 8/1984 | Takaishi et al. | 55/389 X |
| 4,469,628 | 9/1984 | Simmons et al. | 252/629 |
| 4,537,710 | 8/1985 | Komarneni et al. | 252/628 |
| 4,619,225 | 10/1986 | Lowther | 55/75 X |
| 4,673,559 | 1/1987 | Derauane et al. | 423/306 |
| 4,677,096 | 6/1987 | van der Smissen | 55/389 X |
| 4,717,398 | 1/1988 | Pearce | 55/75 X |
| 4,737,316 | 8/1988 | Macedo et al. | 252/633 |
| 4,778,628 | 10/1988 | Saha et al. | 252/633 |
| 4,780,239 | 10/1988 | Snyder et al. | 252/184 |
| 4,859,367 | 8/1989 | Davidovits | 252/628 |
| 4,880,611 | 11/1989 | von Balmoos et al. | 423/306 |
| 4,917,711 | 4/1990 | Xie et al. | 55/75 X |
| 4,976,944 | 12/1990 | Pacaud et al. | 55/75 X |
| 5,032,152 | 7/1991 | Vansant et al. | 55/75 X |

FOREIGN PATENT DOCUMENTS

WO89/01912   3/1989   WIPO.

OTHER PUBLICATIONS

Chemical Abstract, 113:162967z, 1990.
Grobet et al., *Catalysis Letters*, vol. 6, No. 2, pp. 209–214, 1989.
Mark E. Davis et al., "Physiochemical Properties of VPI-5", *J. Am. Chem. Soc.*, vol. III, pp. 3919–3924, 1989.
*Zeolites*, vol. 10, pp. 522–524, Jul./Aug. 1990.
*Zeolites*, vol. 10, pp. 163–168, Mar. 1990.
*Zeolites*, vol. 9, pp. 436–439, Sep. 1989.
Applied Catalysis Letter, (no citation).
Wiggly Masses of Red and Blue, *Chemistry & Industry*, Jun., 1990 (Zeolites).

*Primary Examiner*—Robert Spitzer
*Attorney, Agent, or Firm*—Malcolm B. Wittenberg

[57] ABSTRACT

A process is described by which a chemical species is sorbed into the channels of a host phase which is then heated to affect an irreversible phase transformation of the host phase which seals the chemical species within its crystal structure. The host phase is an insoluble solid, non-toxic and stable both to the chemical species it encases and its environment.

12 Claims, No Drawings

TRAPPING AND SEALING PROCESS

This application is a continuation of application Ser. No. 07/723,788, filed Jul. 1, 1991, now abandoned.

TECHNICAL FIELD OF THE INVENTION

The present invention relates generally to an innovative process for sealing a wide variety of chemical species within the crystal structure of a host phase by effecting a phase transformation upon heating which results in a change of crystal structure such that blockages are generated in the structure. The present invention can be used for the containment of wastes in a stable, solid, insoluble waste form.

BACKGROUND OF THE INVENTION

It is well documented that the current methods of long term storage of hazardous wastes are not acceptable. Burial at sea or in the earth presents the risk of wastes being dissolved if the containers housing them are damaged resulting in the entry of the wastes into the water table. It is necessary to store wastes in such a form that they cannot reenter the environment. It has been established that the most desirable waste form is a solid that can be easily transported and handled. Molecular traps of the present invention represent one possible solution to the problem of hazardous waste containment.

Current wasteform storage methods for low level radioactive wastes include storing wastes in tanks and burying them in the earth. This method relies on the stability of the storage vessel and a clay barrier either lining the pit or as packing material to keep wastes from contaminating the surrounding area. Once the storage vessel erodes or is damaged, water can enter and contact the waste. The clay barrier may be some protection but the waste will eventually diffuse around the clay particles or through cracks. U.S. Pat. No. 4,859,367 teaches of mixing waste with a geopolymer binder which is solidified. This essentially means the waste is encased in cement. Leaching experiments have determined that this is not a satisfactory method.

Ion-exchangers are another important class of materials used for the stabilization of waste. As taught in U.S. Pat. Nos. 3,167,504 and 4,272,382, ionic wastes can be selectively bonded to the ion-exchange material. There are many examples of different ion-exchangers used for the purification of waste streams but no attempt is made to seal the waste within the ion-exchanger after it is sorbed. Therefore the waste could be displaced if the material came in contact with more strongly bound ions and the toxins could be released into the environment.

U.S. Pat. No. 4,778,628 teaches using ion-exchangers as an added layer of barrier when storing chemical wastes. The wastes are not initially bound to the ion-exchanger but stored in sealed containers with a layer of ion-exchanger surrounding the containers. It is envisioned that if leakage occurs the wastes will have to go through a layer of ion-exchanger and could be retained. The disadvantage in this approach is that the wastes would not be permanently bound if a more strongly binding ion comes in contact with the material. The present invention is superior because by sealing of the waste within the structure of the molecular trap the possibility of release into the environment is eliminated.

Others have proposed the idea of structural containment that are radically different from the molecular trap process described herein. For example, it is taught that wastes can be first sorbed onto ion-exchange sites or porous materials such as glasses which are then sintered to collapse their pores, enclosing the wastes within the glass. For example, see U.S. Pat. Nos. 4,737,316, 4,780,239, 3,147,255 and 4,469,628. As this method involves restructuring solids, temperatures in the order of 1000° C. are required and many wastes cannot be considered as they would volatilize at these temperatures. In addition, at these temperatures unwanted side reactions can take place. For example, the waste could react with components of the ion exchanger to form new phases which may segregate from the bulk and be more readily dissolved. The waste could also diffuse to grain boundaries or defect sites which can be more prone to leaching. As the current invention utilizes a unique low temperature rearrangement of the molecular sieve the need for high temperatures is eliminated. This makes it more economical and eliminates the possibility of unwanted side reactions. In addition, a wider variety of wastes can be considered for containment.

Another technology currently under development is called synroc, where hazardous wastes are mixed with a powder containing oxides of calcium, aluminum, zirconium, barium and titanium, calcined to dryness under a "reducing" atmosphere and then heated to high temperatures to form a ceramic. The hazardous waste (heavy metal or radionucleotide) becomes incorporated into the structure of the ceramic. Although this technology incorporates the wastes into the structural matrix of a material, as does the present invention, the mechanisms are drastically different. High temperatures are required to form the synroc material (1000° C.). The present invention involves materials which are easier to synthesize, have a transformation that occurs under mild conditions and results in very stable oxide materials. In addition, the constituents of the present invention are inexpensive and once again a wider range of hazardous materials can be considered for containment.

A related idea involves synthesizing a ceramic material or zeolite in the presence of waste materials so that the waste becomes encased in the cavities of the zeolite and is therefore both structurally and chemically held. For example, see U.S. Pat. No. 3,959,172. This process will not work for a wide range of wastes because zeolite synthesis conditions are rather limited and the presence of a foreign species in solution can inhibit the desired structure from being produced. The present invention is much less limited as the desired channel system is synthesized independently and therefore reproducibly before the waste is introduced into it. As the transformation appears to be unaffected by the presence of sorbates the range of materials that can be encased is very broad.

SUMMARY OF THE INVENTION

The present invention involves a method of trapping a material within one or more channels of a suitable molecular sieve. The material can be a liquid, gas or solid dissolved in a liquid which is of a kinetic size to fit within the pores of the molecular sieve.

The molecular sieve is characterized as possessing an unidimensional channel structure in the form of cavities resulting from the stacking of layers of rings of atoms which is capable of rearranging to a new structure when heated. The rearranged structure is characterized as possessing periodic blockages for trapping the material in the molecular sieve cavities.

DETAILED DESCRIPTION OF THE INVENTION

Molecular traps possess the ability to sorb chemical species within their crystal structure and are therefore a type of molecular sieve. Molecular sieves are characterized as having highly open crystal structures resulting in microporous channels with diameters on the order of molecular dimensions. Consequently they provide easy access to gases and fluids such as water molecules, dissolved ions and hydrocarbons. They include a wide variety of crystal structures encompassing a range of channel dimensions and channel networks. Molecular traps are those molecular sieves which are capable of sorbing chemical species and then, upon heat treatment, undergo an irreversible atomic structural rearrangement in such a way as to trap the sorbed species. A broad range of chemical species can be trapped. The only constraints on the trapped species are that they be small enough to diffuse into the molecular trap's channels in the form of liquids or dissolved solids and that they do not react with the molecular trap as to damage the integrity of the material. The promise of this wide diversity is illustrated below in the working example. The molecular trap described has a large channel diameter capable of sorbing species greater than 10 Å in diameter and composed of an extremely unreactive inorganic oxide.

The composition of molecular traps is only restricted by the constraint that the elements and combinations of elements be capable of forming crystals possessing channel networks which can undergo a thermal transformation such as to block the channels. The working example of a molecular trap described below is that of an aluminophosphate although molecular traps should by no means be restricted to this composition. Many elements and combinations of elements are known to form crystals possessing channel networks. For example, the most commonly known types of molecular sieves, zeolites, consist of silicon, aluminum and oxygen. Another important class of molecular sieves are the aluminophosphates, composed, as their name indicates, of aluminum, phosphorous and oxygen. There are various other oxides and coals which are also molecular sieves. It is highly likely that many molecular traps will be aluminophosphates and aluminosilicates as these materials possess high thermal stability. In addition, the composition of an aluminosilicate or aluminophosphate can be extended by substituting varying amounts of another element into the framework without changing the crystal structure. These substituted compounds greatly extend the range of composition of molecular traps, and the elements of substitution can include the metals such as magnesium, zinc, tin, titanium, cobalt, and mixtures thereof or the elements; silicon (in aluminophosphates), berillium, gallium, germanium, titanium, arsenic, lithium and boron.

Molecular traps can be designed to possess ion-exchange capability in which ions associated with the molecular trap framework are exchanged with other ions from the environment. By careful manipulation of conditions, desired ions (for example, highly toxic or radioactive ions) can be selectively isolated within the molecular trap framework which is then heated to permanently seal the exchanged ion within the structure. The example described below utilizes an aluminophosphate as a molecular trap. It is well known that aluminophosphates can have a variety of other elements incorporated into their framework, thus imparting ion-exchange capabilities.

The aluminophosphate VPI-5 is described as being illustrative of a suitable trap in practicing the present invention. It is an open form of a molecular trap possessing a three-dimensional microporous crystal framework consisting of unidimensional channels defined by 18-member rings. The 18-member rings are the largest known of any reported molecular sieve and this molecular trap is capable of sorbing chemical species with a diameter of over 10 Å. A related material which can also function as the open form of a molecular trap is MCM-9 reported in U.S. Pat. Nos. 4,673,559 and 4,880,611. MCM-9 has the same crystal structure as VPI-5 and in addition it has silicon substituted in the aluminophosphate framework. Although it has been reported that VPI-5 is thermally stable it has been observed that samples of VPI-5 undergo a reproducible low temperature solid state transformation to the closed form of the molecular trap. This new phase has been identified by its x-ray powder diffraction pattern as $AlPO_4$-8 and is reported in U.S. Pat. No. 4,440,871. $AlPO_4$-8 was synthesized independently of VPI-5 and MCM-9 and its relation to these two materials was not known for several years. The phase change of the open form of the molecular trap to the closed form is irreversible. Once converted, the closed form does not return to the open form upon cooling and is stable to several hundred degrees as evidenced by an unchanged diffraction pattern.

Determination of the structure of the closed form of the molecular trap ($AlPO_4$-8) based on its x-ray powder diffraction pattern revealed that $AlPO_4$-8 contains unidimensional channels defined by 14 member rings that can be derived from a contraction of the parent VPI-5. The 14 member ring structure should exhibit high sorption properties but adsorption data suggests that the pores are somehow blocked. Recent high resolution electron microscopy (HREM), electron diffraction and adsorption data determined that stacking disorders perpendicular to the channels are present in the closed form of the molecular trap. These stacking disorders are generated during the transformation.

The parent 18 member ring structure of VPI-5 has hexagonal symmetry and the rectangular 14 member ring structure of $AlPO_4$-8 results from a ring contraction in one of three possible directions. In different parts of the crystal the contraction begins in different directions and stacking disorders are introduced at the layers where these parts meet. In essence, the ring diameter, or the cross-sectional area of the channels is large in both structures. However, where the rings are stacked such that the channels form right circular cylinders in the open structure of the molecular trap, some of the rings are shifted with respect to each other in the closed structure of the trap such that the channels are blocked while still retaining much of their storage capacity. X-ray powder diffraction provides a method of measuring the extent of transformation by the appearance of a characteristic peak for $AlPO_4$-8 at 13–14 Å.

The shifted layers function as trap doors, converting the structure from that of one containing open channels through which chemical species can move freely to one containing isolated cavities which retain the chemical species. The adsorption of molecules as small as oxygen has been successfully repressed while an example of molecular trapping as described below showing that species as small as the hydrated copper ion can be retained.

Two facts have been observed that conflict with reported literature. They are (1) that VPI-5 is thermally stable and does not convert to $AlPO_4$-8, and (2) that $AlPO_4$-8 possesses high adsorption capacity. Instead it has been found that (1) VPI-5 does convert to $AlPO_4$-8 and (2) that $AlPO_4$-8 although it has a large pore structure can, because of the existence of stacking disorders, exhibit adsorption properties of a small pore material.

The present invention however has the potential to exhibit ion-exchange capabilities. By careful manipulation of the composition, ion-exchange sites can be introduced into the molecular trap framework while retaining the open channel structure and the ability to rearrange. Desired ions could be selectively concentrated within the molecular trap's structure which then undergoes the transformation to further immobilize these ions. This is an improvement because now the waste cannot be released to the environment if an ion which has a higher binding strength is present. The appeal of ion-exchange is that it can selectively sorb wastes and retention is strengthened because a chemical bond holds the waste in addition to the blocked channels.

The concept of a stable and irreversible molecular trap is innovative. Both the microporosity of molecular sieves and their thermally induced structural rearrangement have been utilized. Molecular sieves are well known for their capacity to sorb chemical species within their crystal structure. However, chemical species may be desorbed if another more preferred species enters the structure. The classic uses of molecular sieves makes no attempt to retain sorbates. As such, the present invention marks the first effort to use the structural shift involved in a phase transformation to trap chemical species and to limit their return to the external environment.

Molecular sieves for use herein must possess an unidimensional channel structure resulting from the stacking of layers of rings of atoms. What clearly distinguishes them from other molecular sieves is their ability to rearrange to a new structure when heated while retaining open cavities for storage of the chemical species but possessing periodic blockages which block the material from reentering the environment.

VPI-5 is but one example of a material that can function as a molecular trap. The silicon substituted analogue of VPI-5, MCM-9 also undergoes the transformation and other substituted members of this family of molecular sieves should behave likewise.

The property of VPI-5 which allow it to function as a molecular trap is its unidimensional channel structure resulting from the stacking of layers of rings of atoms so that when stacking disorders are introduced the channel is effectively blocked. It exhibits a ring structure that has the capability to rearrange to a smaller ring structure in more than one direction so as to introduce stacking disorders.

The constraint on the rings which defines the channels is that they be capable of rearranging to a smaller ring by a route which generates stacking disorders. For example, $AlPO_4$-8, an aluminophosphate with a very similar structure to VPI-5 does not undergo the transformation. $AlPO_4$-8 possesses unidimensional channels defined by 12 member rings which cannot contract.

The composition of molecular traps useful herein includes those combinations of elements and proportions that form an open crystal structure possessing unidimensional channels which can rearrange upon heating to a material with blocked channels. The composition must also be such that the molecular traps are insoluble in water or any other solvent used to introduce the sorbate. The molecular traps must be composed of non-toxic materials if they are to function as safe wasteforms. For safe use and permanent storage, it is required that they also be of such a composition that they are non-flammable, non-explosive and non-reactive with the sorbates or any chemical species in their external environment. Molecular traps are most likely therefore oxide materials although they are by no means restricted to this.

The power of the molecular trap comes from its extreme versatility. The chemical species to be contained can be either a liquid or a soluble solid. Their size is limited only by the dimensions of the channels of the molecular trap. Their compositions are limited only in that they must not break down the molecular trap. As the example which follows illustrates, molecular traps possess large channel dimensions and are composed of extremely stable materials making it possible to contain a wide range of sorbates.

Species that can be contained within the molecular trap include hydrocarbons and soluble metal salts and complexes which can be introduced in solution into the channels. The materials to be contained in the molecular trap must have a kinetic diameter small enough to fit in the channels. For VPI-5 and MCM-9 a kinetic diameter of 10 Å or less is required. Small molecules (kinetic diameter less than 2.5 Å) may be able to diffuse past the blocked layers but this does not appear to present a problem for metal ions as they generally exist in the hydrated form (when water is used as a solvent) increasing their kinetic diameters.

Many hydrocarbons that can be trapped within the crystal structure of a molecular trap might be in the gas phase at the transformation temperature of the particular molecular trap. These can be trapped by placing the precursor molecular sieve in a sealed vessel containing the hydrocarbon and heating to the transformation temperature. In this way gas phase hydrocarbons will be at equilibrium both inside and outside the pores; those inside can be trapped within the structure. The amount of hydrocarbon sealed in the molecular trap will be determined by the pressure at the transformation temperature, the total pore volume and the total volume of the chamber. The amount trapped in the pores can be maximized by packing the chamber with the molecular trap to minimize dead volume.

Metal salts and complexes can be most easily introduced into the pores by dissolving in an appropriate solvent mixed with the molecular trap to form a slurry which is then removed at a temperature below the transformation temperature to avoid rearrangement before the maximum amount of ion is contained within the pores. The radius of most ions is less than 2.5 Å but they generally exist as solvated species in aqueous solution increasing their effective size to greater than 3 Å. Complexation with suitable ligands can effectively increase their ionic radius to ensure that they are tightly held in the closed form. The ligands must be chosen such that the kinetic diameter in at least one direction is less that 10 Å (in the case of VPI-5) and the material is soluble in a suitable solvent. The choice of solvent is not limited to $H_2O$; other solvents can include alcohols, acetone, ammonia and alkanes.

The solvent can be removed, either by evaporation under vacuum or at atmospheric pressure, leaving the metal ion dispersed on the surface and within the pores of the molecular trap. In the example described it is not necessary that the molecular trap be completely dry. The amount of sorbate contained within the pores can be optimized by adding small amounts of highly concentrated solutions.

The transformation is effected by heating the dried molecular trap. In the specific example described the molecular trap can be dried in air or steam. The time and temperature of the transformation can vary. In this illustration the material is heated at 100° C. for 26 hours although the temperature can vary from 80°–550° C. and the time from less than an hour to several days. In the specific example the presence of a new peak in the range of 13–14 Å in the x-ray powder diffraction spectrum can be used to determine the degree to which the transformation has occurred.

In another scenario ions can be selectively complexed out of solution by molecular traps which contain ion exchanging capabilities. The molecular trap can be placed in contact with a solution containing the ion of interest. After a predetermined length of time the solid molecular trap now containing the complexed ion is removed from the solution.

If necessary the molecular trap is dried and then heated to affect the transformation to the closed form.

On site containment of hazardous wastes (hazardous waste remediation) may be accomplished by addition of a molecular trap into a waste site, with provision for procedures that would allow contact and sorption between the molecular trap and the sorbable hazardous waste species with the application of a mild, controlled thermal pulse. As a consequence, a structural rearrangement to the closed form traps the hazardous waste inside the crystal structure, rendering it immobile, thus allowing for removal or disposal in-situ.

Stability issues are of prime importance in dealing with hazardous wastes. The closed form of the molecular trap should be durable under catastrophic transport accident scenarios and breaches in the repository where flowing water contacts the waste form at elevated temperatures and pressures. The example described below is stable to at least 800° C. in dry air and at least 550° C. in water vapor.

The example given can be fabricated at moderate temperatures, using inexpensive chemical feed stocks. The final waste form is hydrothermally stable. In addition this process could be used for in-situ hazardous waste remediation as the transformation conditions are mild enough to consider applying on site.

VPI-5 is illustrative as being useful in practicing the present method. It is a molecular sieve characterized as having an unidimensional channel system defined by 18 members characterized by the x-ray power diffraction reported in U.S. Pat. Nos. 4,673,559 and 4,880,611. It is further an aluminophosphate with the composition $Al_2O_3$ (0.8–1.0) $P_2O_5$ being a substituted aluminophosphate such that oxides of one or more metals are also incorporated in the oxide lattice. Silicon, magnesium, zinc, tin, zirconium, titanium, cobalt, and mixtures thereof or one or more of the elements are also incorporated in the oxide lattice such as beryllium, gallium, germanium, titanium, arsenic, lithium and boron.

When heated VPI-5 transforms in whole or in part to AlPO4-8 as identified by the x-ray powder diffraction pattern reported in U.S. Pat. No. 4,440,871 specifically with the appearance of a new peak at 13–14 Å. It possess a greatly reduced adsorption capacity due to the presence of stacking disorders.

The molecular trap can be synthesized as reported in U.S. Pat. Nos. 4,673,559 and 4,880,611 and Davis, M. E. Montes, C., Hathaway, P. E., and Graces, J. M. in *Zeolites '89, Proceedings of the 8th International Zeolite Conference*, 1989, 111, 3919. and Davis, M. E., Montes, and Garces, J. M., *ACS Symp. Ser.*, 398, 1989, p. 291, the disclosures of which are incorporated herein by reference. Although these references report that the material synthesized does not convert to AlPO4-8 upon heating, samples prepared following these synthesis procedures were observed to convert when heated.

EXAMPLE I

A copper chloride solution was prepared by first dissolving 2.87 g of $CuCl_2$ in 50 ml of $H_2O$. A 9.76 ml portion of the slurry was diluted to 100 ml to obtain a final solution with a calculated copper concentration of 0.042M. Addition of 48.74 ml of this solution to 5.10 g of VPI-5 produced a slurry with a calculated ratio of 0.40 mmol Cu:g VPI-5. This slurry was stirred at room temperature for 24 hours and the solvent evaporated at room temperature. Evaporation required over 40 hours and was encouraged by passing a stream of air over the slurry. A 1.52 g portion of the VPI-5$_{[CuCl_2]}$ mixture was heated at 100° C. for 26 hours to effect transformation to AlPO4-8.

EXAMPLE II

A copper chloride solution was prepared by dissolving 1.06 g of $CuCl_2$ in 100 ml of methanol to obtain a solution with a calculated copper concentration of 0.079M. Addition of 24.54 ml of this solution to 4.84 g of VPI-5 produced a slurry with a calculated ratio of 0.40 mmol Cu:g VPI-5. This slurry was stirred at room temperature for 24 hours and the solvent evaporated at room temperature. Evaporation required approximately eight hours and was encouraged by passing a stream of air over the slurry. A 1.20 g portion of the VPI-5$_{[CuCl_2]}$ mixture was heated at 100° C. for 26 hours to effect transformation to AlPO4-8.

EXAMPLE III

Confirmation that copper chloride had permeated the pores of VPI-5 was obtained by performing simple pore gauging experiments. Accurately weighed VPI-5 or VPI-5 $_{[CuCl_2]}$ was placed in a round bottom flask equipped with an adapter containing a vacuum stopcock. The flask was evacuated to a pressure of $10^{-7}$ torr for one hour at room temperature. The weight was recorded while still under vacuum and the difference was attributed to water loss. The material was then exposed to cyclohexane vapor at room temperature for 24 hours and the weight gain recorded.

X-ray powder diffraction analysis of VPI-5$_{[CuCl_2]}$ and AlPO$_4$-8$_{[CuCl_2]}$ was performed using CuKα radiation.

The amount of copper that could be reclaimed from VPI-5$_{[CuCl_2]}$ and AlPO$_4$-8$_{[CuCl_2]}$ was determined by titration. To accurately weighed samples (approximately 0.15 g each) of each material was added 3 ml of $H_2$ and the mixture was allowed to stand for four days with occasional stirring. Then the solution was separated from the powder and the amount of $Cu^{2+}$ was determined by titration with a 0.010M solution of $Na_2S_2O_3$, in the presence of KI and a starch indicator.

EXAMPLE IV

A $Na_2S_2O_3$ solution was prepared by adding 2.63 g of $Na_2S_2O_3.5H_2O$ to 100 ml of $H_2O$ and then taking a 9.93 ml portion and further diluting it to 100 ml to obtain a solution with calculated [$S_2O_3$=] of 0.0105M. A starch solution was prepared immediately before titration by mixing 2 g of starch in 60 ml of $H_2O$ which was added to 200 ml of boiling $H_2O$ and heated for an additional two minutes and then allowed to cool. A potassium iodide solution was prepared by dissolving 3 g of KI in 20 ml of $H_2O$.

The titrations were performed by taking the Cu solution of interest, adding 2 ml of the KI solution and titrating with the $S_2O_3$=. Just before the yellow color from $I_2$ disappeared 3 ml of the starch solution was added, producing a deep black solution, to assist in determination of the endpoint.

Using this method the actual concentrations of the original $CuCl_{2(MeOH)}$ solutions were determined and the amount of Cu that could be reclaimed from VPI-5$_{[CuCl_2]}$ and AlPO$_4$-8$_{[CuCl_2]}$ prepared from an $H_2O$ and methanol slurry was found. It was also determined that VPI-5 and AlPO$_4$-8 did not react to influence the endpoint. It was later determined that it was not necessary to separate the solution from the molecular trap.

Copper chloride was introduced into the pores of VPI-5 by mixing solution of copper chloride, either dissolved in water or methanol, with the VPI-5 to form a slurry followed by evaporating the solvent at room temperature. In this way the total amount of copper was accurately known. The amount of copper chloride within the pores was determined by equilibrium with the solution outside the pores (which changed as the solution became more concentrated) and by the rate of diffusion into the pores (which was affected by precipitated copper chloride as the solution became more concentrated). It was assumed that there was a distribution of copper chloride both in the channels and on the surface of the powder after the solvent had evaporated.

When copper chloride was added to VPI-5 and the solvent removed a light green powder was produced. After heating the powder remained a light green. Table 1 lists the x-ray powder diffraction spectra of VPI-$5_{[CuCl_2]}$ and AlPO$_4$-8 $_{[CuCl_2]}$. For VPI-$5_{[CuCl_2]}$ the characteristic low angle d-spacing at 16.4 Å was observed and no new peak at 13–14 was seen. A new peak at 14.1 Å was observed in the x-ray powder diffraction pattern of the heated material indicating it had converted to AlPO$_4$-8.

X-ray powder diffraction confirmed that the material remained VPI-5 after the addition of copper chloride and the removal of solvent. The peaks match that reported for VPI-5 and extra peaks indicated some H3 impurity. An intense peak at 3.28 Å was attributed to copper chloride. Confirmation that the transformation did occur in the presence of sorbed copper chloride was obtained from the x-ray powder diffraction pattern. Specifically a new peak of 14.14 Å was observed. This spectrum matches reported spectra for AlPO4-8 with H3 and the presence of a peak at 8.23 indicates that there may be some untransformed VPI-5 present.

The adsorption measurements are summarized in Table 2. After copper chloride was introduced adsorption of both water and cyclohexane were substantially lower than that of pure VPI-5 and remained low after the material had been transformed to AlPO4-8.

The adsorption measurements for H$_2$O and cyclohexane were comparable to results obtained using Mcbain Bark apparatus for VPI-5. The lowered adsorption of H$_2$O and cyclohexane suggests that copper chloride was inside the VPI-5 channels. That the adsorption of both cyclohexane and water remained low after the transformation was a consequence both of copper chloride being in the pores and the presence of stacking disorders.

The amount of copper reclaimed was determined by dissolving all the accessible copper chloride in H$_2$O to form solvated copper ion followed by titrating the resultant solution. The reactions that occurred during the titration are:

$$2Cu^{2+}+4I^-\rightarrow Cu_2I_2+I_2 \text{(yellow/black)} \quad I_2+2S_2O_3^{2-}\rightarrow 2I^-+S_4O_6^{2-}$$

Copper ion reacted with iodide ion to form iodine. The iodine then reacted with thiosulfate to reform iodide ion. The endpoint was determined by the disappearance of the iodine, which formed a dark blue-black complex with starch.

Table 3 summarized the results of the titrations. Two series were done, one where the copper solution was prepared with H$_2$O and one with methanol. The concentrating of the copper chloride solutions were calculated based on the weight of copper chloride added and on the results of titrations with sodium thiosulfate. In both the H$_2$O and methanol series the concentration obtained from the titration was slightly lower than that calculated based on weight. The precision of the titration results was 3%. The total CuCl$_2$ (mmol CuCl$_2$/gVPI-5) was 0.040 based on the concentration of CuCl$_2$ determined by weight and 0.037 based on the concentration of CuCl$_2$ determined by titration. The amount of copper reclaimed from VPI-$5_{[CuCl_2]}$ was identical to the total copper. The VPI-5 was white after reclaiming the copper chloride—another indication that all the copper was removed Under identical conditions only 50% of the copper chloride was reclaimed from the AlPO4-8 samples and the material still maintained a green color. Control experiments confirmed that VPI-5 and AlPO4-8 do not influence the titration.

Titration of the known solutions established the precision and accuracy of the technique. The precision was 3%, the accuracy was slightly less which could be attributed to small amounts of weighed solid that did not dissolve. By allowing the VPI-$5_{[CuCl_2]}$ to equilibrate with water for four days all the copper chloride could be reclaimed.

Under similar conditions only 50% of the copper chloride was reclaimed from the AlPO$_4$-8 samples. The fact that all the copper was reclaimed from the VPI-5 samples established that a value lower than the total could not be attributed to an experimental error. The copper chloride had to be distributed between the surface and the pores of the material and therefore the amount reclaimed was attributed to surface copper chloride. The remaining copper chloride was trapped within the crystal structure of the AlPO$_4$-8 confirming the hypothesis that VPI-5/AlPO$_4$-8 functioned as a molecular trap.

In fact other samples showed that all copper could be reclaimed from VPI-5 after less than one day, the samples were left four days as a better test of the material. Heterogeneity between samples caused the deviations in the measured values of reclaimed copper chloride to be approximately 30%. Even with this higher error the data clearly showed that copper chloride was retained within the AlPO$_4$-8.

TABLE 1

X-ray Powder Diffraction.Patterns (*H3 impurity)

| VPI-5[CuCl$_2$] | | | | AlPO$_4$-8[CuCl$_2$] | | | |
|---|---|---|---|---|---|---|---|
| 2th | I | dsp | I/Io | 2th | I | dsp | I/Io |
| 5.40 | 7.7 | 16.365 | 44 | 5.35 | 2.0 | 16.518 | 17 |
| 9.10 | 1.2 | 9.718* | 7 | 6.25 | 1.6 | 14.141 | 13 |
| 10.40 | 3.1 | 8.506 | 18 | 9.80 | 2.1 | 9.025 | 18 |
| 10.75 | 8.4 | 8.23 | 47 | 10.75 | 2.0 | 8.230 | 17 |
| 12.80 | 1.9 | 6.916* | 11 | 12.80 | 1.8 | 6.916* | 15 |
| 13.60 | 1.3 | 6.511* | 7 | 13.60 | 1.3 | 6.511* | 11 |
| 14.25 | 2.6 | 6.215 | 15 | 14.30 | 1.6 | 6.194 | 13 |
| 15.70 | 0.7 | 5.644* | 4 | 15.65 | 1.5 | 5.662* | 13 |
| 16.15 | 1.3 | 5.488 | 7 | 16.10 | 1.0 | 5.505 | 8 |
| 17.90 | 1.6 | 4.955 | 9 | 17.15 | 1.4 | 5.170 | 12 |
| 18.25 | 3.8 | 4.861* | 21 | 18.10 | 2.5 | 4.901* | 21 |
| 18.60 | 6.7 | 4.77 | 38 | 18.60 | 1.1 | 4.770 | 9 |
| 20.80 | 3.1 | 4.270 | 18* | 19.65 | 2.6 | 4.519 | 22 |
| 21.65 | 10.6 | 4.105 | 60 | 19.90 | 2.0 | 4.462 | 17 |
| 21.95 | 8.7 | 4.068 | 49 | 20.00 | 2.7 | 4.439 | 23 |
| 22.30 | 5.6 | 3.996 | 32 | 20.35 | 1.1 | 4.364 | 9 |
| 22.50 | 5.4 | 3.952 | 31 | 20.80 | 2.1 | 4.270* | 18 |
| 23.50 | 10.8 | 3.786 | 6 1 | 21.30 | 3.0 | 4.171 | 25 |
| 23.75 | 1.8 | 3.746 | 10 | 21.60 | 11.9 | 4.114 | 100 |
| 24.40 | 3.3 | 3.648 | 19 | 21.80 | 2.6 | 4.077 | 22 |
| 24.75 | 4.1 | 3.597 | 23 | 22.30 | 2.7 | 3.986 | 23 |
| 26.00 | 1.9 | 3.427 | 11 | 22.50 | 6.7 | 3.952 | 56 |
| 26.20 | 3.0 | 3.401 | 17 | 22.65 | 6.9 | 3.926 | 57 |
| 27.15 | 17.7 | 3.294 | 100 | 23.45 | 2.0 | 3.794 | 17 |
| 28.15 | 5.9 | 3.17 | 33 | 24.30 | 0.7 | 3.663 | 6 |
| 28.65 | 1.3 | 3.116 | 7 | 24.95 | 3.8 | 3.569 | 32 |
| 28.90 | 10.5 | 3.089 | 59 | 25.70 | 1.2 | 3.466 | to |
| 29.40 | 3.0 | 3.038 | 17 | 26.10 | 1.9 | 3.414 | Is |

TABLE 1-continued

X-ray Powder Diffraction Patterns (*H3 impurity)

| VPI-5[CuCl₂] | | | | AlPO₄-8[CuCl₂] | | | |
|---|---|---|---|---|---|---|---|
| 2th | I | dsp | I/Io | 2th | I | dsp | I/Io |
| 30.20 | 10.6 | 2.959 | 60 | 27.10 | 3.3 | 3.290 | 28 |
| 30.75 | 5.1 | 2.908 | 29 | 28.15 | 1.8 | 3.170 | 15 |
| 31.70 | 1.0 | 2.923 | 6 | 29.90 | 3.1 | 3.089 | 26 |
| 32.35 | 3.0 | 2.767 | 17 | 29.40 | 3.8 | 3.038 | 32 |
| 32.65 | 10.4 | 2.743 | 59 | 30.20 | 1.7 | 2.959 | 14 |
| 33.33 | 2.6 | 2.697 | 15 | 30.70 | 1.5 | 2.912 | 13 |
| 34.00 | 3.2 | 2.637 | 18 | 31.50 | 1.6 | 2.840 | 13 |
| 34.90 | 0.8 | 2.571 | 5 | 32.60 | 3.2 | 2.747 | 27 |
| 35.90 | 3.1 | 2.508 | 18 | 33.30 | 2.1 | 2.691 | 18 |
| 37.65 | 1.0 | 2.389 | 6 | 34.40 | 1.7 | 2.607 | 14 |
| 38.30 | 3.9 | 2.350 | 22 | 34.80 | 1.5 | 2.578 | 13 |
| 39.50 | 1.3 | 2.281 | 7 | 36.35 | 3.5 | 2.347 | 29 |
| 39.95 | 1.3 | 2.256 | 7 | 44.60 | 5.6 | 2.032 | 47 |
| 41.10 | 1.9 | 2.196 | 11 | 48.50 | 1.3 | 1.677 | 11 |

TABLE 2

Adsorption Data

| | Wt % H₂O | Wt % cyclohexane |
|---|---|---|
| VPI-5 | 21% | 17% |
| VPI-5[CuCl₂(H₂O)] | 11% | 2% |
| VPI-5[CuCl₂(MeOH)] | 12% | 0% |
| AlPO₄-8[CuCl₂(H₂O)] | 4% | 1% |
| AlPO₄-8[CuCl₂(MeOH)] | 16% | 9%* |

*some exposure to atmosphere and possible water adsorption altering value.

TABLE 3

Titration Results

| Solvent | H₂O | MeOH |
|---|---|---|
| Calculated [CuCl₂] | 0.042 | 0.079 |
| Measured [CuCl₂] | 0.038 (1%) | 0.073 (3%) |
| Total CuCl₂ | | |
| (mmol CuCl₂/gVPI-5) | | |
| a) based on calculated (CuCl₂) | 0.40 | 0.40 |
| b) based on measured (CuCl₂) | 0.36 | 0.37 |
| Reclaimed Cu | | |
| a) mmol Cu²⁺/g VPI-5 | 0.43 ± .06 | 0.51* |
| | (0.36–0.49) | only one sample |
| b) mmol Cu²⁺/g AlPO₄-8 | 0.17 ± 0.03 | 0.20 ± .05 |
| | (0.14–0.19) | (0.16–0.25) |

It has been shown that VPI-5/AlPO₄-8 can function as a molecular trap, sorbing chemical species in VPI-5's channels and then retaining them within its crystal structure after being transformed to AlPO₄-8 with mild heating. A solution of copper chloride has been introduced into the pores of VPI-5 the solvent evaporated and the material heated to affect the transformed to AlPO₄-8. Adsorption measurements show that copper chloride is inside the pores of VPI-5. X-ray powder diffraction confirms that the transformation of AlPO₄-8 does occur in the presence of sorbed copper chloride. Titration experiments revealed that all of the copper chloride was reclaimed from the untransformed VPI-5 while only 50% of the copper chloride was reclaimed from the AlPO₄-8 under identical conditions. Therefore copper chloride was trapped within the crystal structure of AlPO₄-8. The molecular trap can be used to store hazardous wastes.

I claim:

1. A method of trapping metal ions within one or more channels of a molecular sieve comprising providing a molecular sieve having substantially the crystal structure of VPI-5 being characterized as possessing a channel structure capable of rearranging when heated to a structure possessing periodic blockages, contacting a liquid containing dissolved metal ions with said molecular sieve and subjecting said molecular sieve to heat sufficient to create said periodic blockages and trap said metal ions.

2. The method of claim 1 wherein said molecular sieve has substantially the composition of VPI-5.

3. The method of claim 2 wherein said molecular sieve contains elements other than aluminum, phosphorous, and oxygen substituted in its crystal structure.

4. The method of claim 1 wherein said molecular sieve comprises a member selected from the group consisting of VPI-5 and MCM-9.

5. The method of claim 1 wherein said molecular sieve is substantially insoluble in water.

6. The method of claim 1 wherein said molecular sieve is substantially non-reactive with said metal ions.

7. The method of claim 1 wherein said molecular sieve contains ion-exchange sites.

8. The method of claim 1 wherein said metal ions dissolved in said liquid possess a kinetic diameter to enable said ions to enter said channels.

9. The method of claim 8 wherein said dissolved metal ions possess a kinetic diameter of 10 angstroms or less.

10. The method of claim 8 wherein said dissolved metal ions comprise hydrated metal ions.

11. The method of claim 8 wherein said dissolved metal ions comprise metal ions complexed with a ligand.

12. The method of claim 8 wherein said metal ions comprise toxic or hazardous metal ions.

* * * * *